United States Patent Office 3,400,260
Patented Sept. 3, 1968

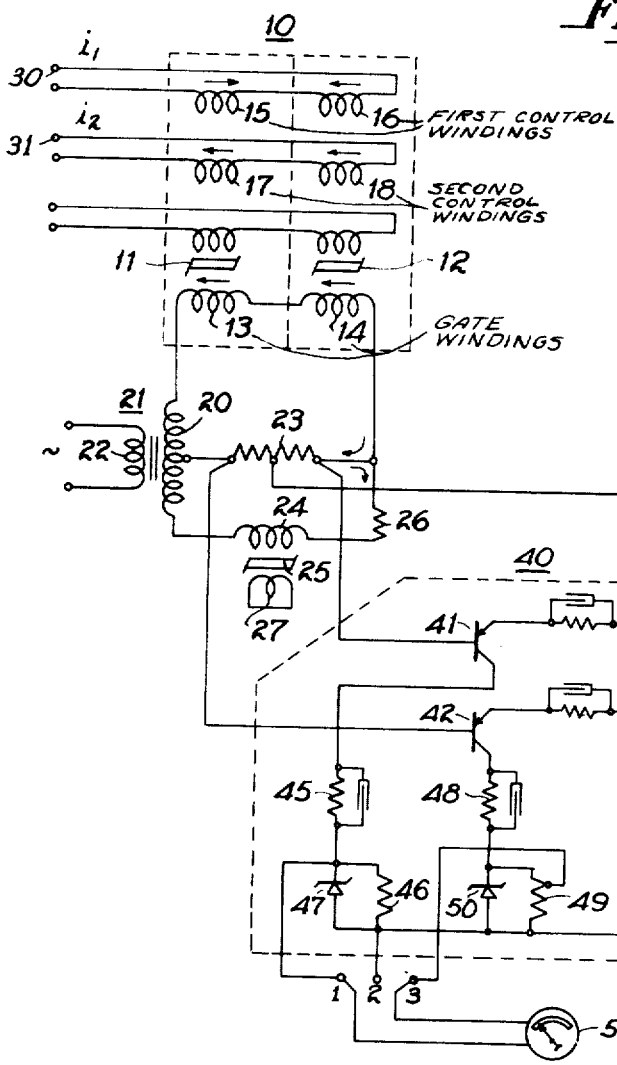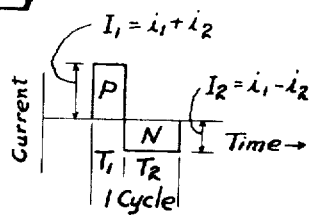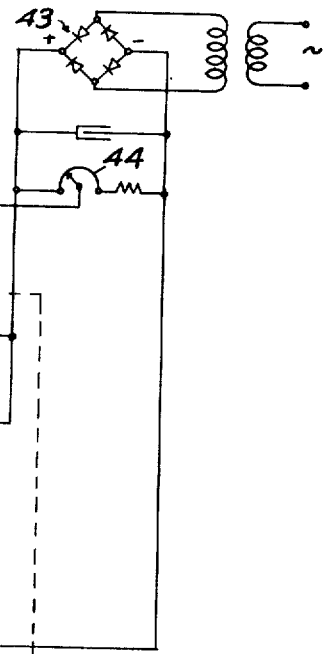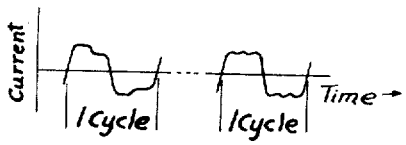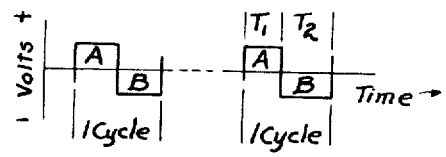
Fig. 1. Fig. 2. Fig. 3. Fig. 4.
INVENTOR.
Max J. Kramer
BY Howard B. Funk
ATTORNEY

3,400,260
TRANSDUCTOR PULSE-TIME CONTROL AND DIVIDER SYSTEM
Max J. Kramer, Parma, Ohio, assignor to Aluminum Company of America, Pittsburgh, Pa., a corporation of Pennsylvania
Filed July 30, 1964, Ser. No. 386,167
11 Claims. (Cl. 235—196)

This invention relates to an alternating current magnetic pulse-time control system and more particularly to a direct current controlled saturable core transductor system for achieving pulse-width or time control and division by time-division.

An object of my invention is to provide an alternating current pulse-time control system which employs a series transductor having a pair of square-loop saturable magnetic cores excited from an A.C. voltage source of a given frequency with separate D.C. input or control currents to produce proportional alternating current output with asymmetrical positive and negative going waves as to crest heights and time-widths and related to each other in accordance with the sum and difference, respectively, of the D.C. input currents.

Another object of my invention is to provide a simple and accurate saturable magnetic core divider differentially controlled by direct currents that are proportionally representative of quantities to be divided for determining the ratio of such quantities.

Still another object is to provide a saturable core transductor system of the type described which includes a compensating arrangement for neutralizing the exciting current for the transductor cores.

A further object is to provide a D.C. controlled electromagnetic induction divider arrangement which will be highly sensitive in operation with control current inputs of very low power levels to produce alternating square-wave output currents having crest heights proportional to and time-widths inversely proportional to the sum and difference, respectively, of the control current inputs.

A further object is to provide a transductor system of the character described and including means for producing unidirectional square wave pulses of controlled variable time-width with respect to an A.C. cycle of a given frequency, in short a variable pulse-width generator.

The invention as to organization and method of operation together with further features and advantages thereof, will become apparent from the following description taken in conjunction with the accompanying drawing in which:

FIG. 1 is a schematic circuit diagram of my invention inclusive of the basic saturable magnetic core pulse-time control transductor and its associated amplifier-clipper circuit arrangement for the production of a quotient and of variable time-width pulses;

FIG. 2 is a graph typically representative of an idealized square wave output current from the transductor under the condition of different D.C. excitations of its two cores by separate control currents;

FIG. 3 is a graph which shows the transductor square wave output without and with compensation for the exciting current for its cores; and FIG. 4 is a graph showing two output wave forms and the time proportion of their pulses appearing in the output circuit under conditions of the transductor connected input only and of the transductor connected input and buck-boost inputs, respectively, to the magnetic divider cores.

In carrying out my invention, for indicating the ratio of two electrical quantities and conditions representable in terms of electrical quantities, such as indicating $E/I$ of a D.C. power circuit for example, I provide a dual D.C. input, series transductor 10 which is shown in diagrammatic form in FIG. 1. It comprises a pair of toroid cores 11 and 12 composed of one of the high permeability magnetic materials whose hysteresis loop is substantially rectangular, such as HyMu or Orthonol material, so as to render the transductor sensitive to very small input control currents. Each core has a plurality of distributed winding means thereon comprising on the respective cores series connected gate windings 13 and 14, series connected first input control windings 15 and 16, and series connected second input control windings 17 and 18. The inputs are fundamentally D.C. amperes, milliamperes or microamperes and the transductor components are designed accordingly. The cores may have additional input windings thereon for application of additional control currents thereto, as desired.

One end of the series connected gate windings 13–14 is connected to one end of center-tapped secondary winding 20 of transformer 21 whose primary 22 is connected to an A.C. supply source (not shown). The other end of the gate windings is connected in series with a center-tapped load resistor 23 which in turn connects with the center tap of the transformer secondary winding 20. Thereby, a suitable low voltage of a given frequency, such as 60 cycles per second, is supplied to gate windings 13–14 and load resistor 23. The other end of the secondary winding 20 connects to the winding 24 of a compensating core 25 of similar magnetic material to cores 11, 12, and series resistor 26 to the common point between load resistor 23 and gate winding 14. Core 24 may have a few short-circuited turns 27 thereon for best effect, the compensator being for the purpose hereafter described.

A pair of input or control currents $i_1$ and $i_2$ are applied to the terminals 30 and 31, respectively, the first control windings 15–16 being connected to terminals 30 and the second control windings 17–18 being connected to terminals 31. These input currents constitute the D.C. excitation for the cores 11 and 12. They are separate direct currents and have a magnitude corresponding to some predetermined relation to the quantities or functions to be divided, such as being proportionally representative of E and I of a D.C. power circuit as hereinabove mentioned.

As is well known in the case of a series connected D.C. controlled transductor, there is identical D.C. excitation of its cores and the A.C. output current is a so-called square wave with its positive and negative-going portions of identical time-widths and of equal crest heights and proportional to the control direct current. Any changes in the control current vary the output current crest values only in direct relation.

I have discovered, however, that by providing each core of the transductor with different D.C. excitation by use of separate D.C. inputs, the resultant A.C. output current square wave will be asymmetrical as to crest heights and time-widths and related to each other conformably with the sum and difference, respectively, of the input control currents. Accordingly, I connect the control windings 15–16 and 17–18 in their respective circuits with such polarities that they are in buck-boost relationship on the respective cores 11 and 12, as indicated by the arrows adjacent thereto indicating the direction of D.C. excitation. It is to be seen that the cores will be differentially magnetized or excited in accordance with the difference and the sum, respectively, by the currents flowing in the control windings. Specifically, as shown, the D.C. currents are subtractive in core 11 and additive in core 12. The instantaneous polarity of the gate windings 13 and 14 is also indicated by the arrows adjacent thereto. With the polarities shown, current $i_1$ constitutes a "transductor operation" input and current $i_2$ constitutes the "buck-boost" input.

By reason of this buck-boost relationship of the control windings on the respective cores, the A.C. output positive-going and negative-going current will be characterized by having different crest heights and different time-widths or durations in the A.C. cycle, with the time difference therebetween strictly proportional to the ratio of the input control currents. This may be shown as follows:

By transductor theory: $I_1$ is total D.C. input to core 1 and $I_2$ is total D.C. input to core 2. Then from the fundamental concept $I_1 \times T_1 = I_2 \times T_2$, where $T_1$ and $T_2$ is time in seconds, wherefore the output current is a so-called square wave with equal positive and negative crest heights and time-widths (½ cycle each) in the case of the customary transductor where $I_1$ and $I_2$ are equal.

However, if $I_1$ and $I_2$ are the sum and the difference, respectively, of input currents in several windings on each core, and, for simplicity, assuming $$I_1 = i_1 + i_2 \text{ and } I_2 = i_1 - i_2$$

as indicated on FIG. 2,
Then:

$$(i_1 + i_2)T_1 = (i_1 - i_2)T_2$$

and may be written $$i_1 T_1 + i_2 T_1 = i_1 T_2 - i_2 T_2$$

Rearranging:

$$i_1 T_1 - i_1 T_2 = i_2 T_2 - i_2 T_1$$

or $$i_1(T_1 - T_2) = i_2(T_2 + T_1)$$

Then:

$$\frac{i_2}{i_1} = -\frac{T_1 - T_2}{T_1 + T_2} = \frac{T_2 - T_1}{T_1 + T_2}$$

But:

$T_1 + T_2 =$ time for 1 cycle, $1/f$, of A.C. power

Therefore:

$$\frac{i_2}{i_1} = f(T_2 - T_1)$$

Thus, in accordance with my invention with separate input currents $i_1$ and $i_2$ applied to the input terminals 30 and 31, the transductor output current is, idealized, a square wave of asymmetrical form with respect to crest height and time-width of the positive- and negative-going portions P and N of this output, as shown in FIG. 2. As indicated, the crest heights of the portions P and N are inversely proportional to and the time-widths thereof are inversely related to the sum and the difference, respectively, of the input currents $i_1$ and $i_2$. In addition, the time difference between the output pulses is strictly proportional to the ratio of the input currents.

The foregoing may be illustrated in tabular form with various inputs, as follows:

| $i_1$ | $i_2$ | $I_1$ | $I_2$ | Sec. $T_1$ | Sec. $T_2$ | $f(T_2-T_1)$ | $i_2/i_1$ |
|---|---|---|---|---|---|---|---|
| 100 | 10 | 110 | 90 | 90 | 110 | .1 | .1 |
| 25 | 10 | 35 | 15 | $\frac{200f}{15}$ | $\frac{200f}{35}$ | .4 | .4 |
| 60 | 45 | 105 | 15 | $\frac{50f}{15}$ | $\frac{50f}{105}$ | .75 | .75 |
| 100 | 100 | 200 | 0 | $\frac{120f}{0}$ | $\frac{120f}{200}$ | 1.0 | 1.0 |
|  |  |  |  |  | $200f$ |  |  |

*($I_1 = i_1 + i_2$ and $I_2 = i_1 - i_2$.)

For line 4, where $i_1 - i_2 = 0$ and the tabulation shows perfect agreement between $i_2/i_1$ and completed time ratio, the practical limit of application is past or exceeded, since core 11 has zero direct current $I_2$ and cannot function properly. In practice, neither core should have less than approximately 10% of the sum input to a core.

In the operation of the transductor divider, the idealized output wave shape of FIG. 2 is not realized for reasons well known in the art. In addition, the output current wave shape has a crest of stepped form, as shown to the left in FIG. 3, which is caused by out-of-phase exciting current of cores 11 and 12. This distortion may limit the useful range of a small size divider. To reduce the distortion, exciting current from compensating core 25 flows in the compensator circuit and through output resistor 23 in opposition to the exciting current from cores 11, 12. As a result, the crest form of the wave shape is reduced from the large step to a slight ripple, as shown to the right in FIG. 3, thereby allowing an amplifier, indicated generally at 40, to function accurately down to lower input levels to the amplifier as provided by the transductor divider and taken across the load resistor 23 thereof.

The amplifier is a squaring amplifier preferably of the transistor type adjusted to saturate at low level inputs and producing fairly constant voltage output. It may consist of two transistors 41 and 42 with appropriate D.C. power source 43 including balancing means rheostat 44. The transistor inputs connect across load resistor 23 whose center tap is the common bias return connected to the slider of rheostat 44. The emitter circuit of each transistor connects to one side of the D.C. power supply and the collector output circuit of each includes a pair of series connected load resistors and connects to the other side of the D.C. power supply. When the square wave voltage across load resistor 23 is driving the base of transistor 41 negative, the transistor switches on and transistor 42 is switched off since its base is then positive. Transistor 41 collector current flows through its load resistors 45 and 46, the outermost resistor 46 being shunted by a Zener diode 47. Similarly, when the polarity across resistor 23 cyclically reverses, transistor 41 shuts off and transistor 42 switches on and its collector current flows through its load resistors 48 and 49, the outermost resistor 49 being shunted by a Zener diode 50. One of the resistors 46 and 49 may be tapped for circuit balancing. A plurality of output terminals 1, 2 and 3 permit different outputs, as desired, to be taken from the amplifier, 2 being a common negative terminal and 1 and 3 being connected to the positive side of the outermost resistors 46 and 49 and their shunting Zener diodes 47 and 50, respectively.

In operation, the transistors are alternately switched on and conduct for intervals corresponding to the respective times $T_1$ and $T_2$ of the wave portions P and N appearing across transductor load resistor 23. The square wave voltage pulses resultantly appearing across the resistors 46 and 49 due to the collector current flow therethrough are held to a constant level by the action of their shunting Zener diodes and the average voltage across each is now directly proportional to the amplifier output pulse time, and this pulse time is identical with the input times $T_1$ and $T_2$. These output voltage pulses are shown as A and B in FIG. 4. The wave form shown to the left in FIG. 4 exists when input current $i_1$ flows in windings 15-16 and input current $i_2 = 0$. For this condition, the D.C. excitation for cores 11 and 12 is identical and the gate current is a symmetrical generally square wave which triggers the amplifier 40 for equal time periods so the time-widths of the amplifier output pulses are identical. The wave form shown to the right in FIG. 4 is produced when both input currents $i_1$ and $i_2$ are flowing in the control windings of the transductor, whereby the gate current is an asymmetrical square wave, as heretofore described. By the action of the amplifier, as controlled by such a symmetrical gate current, square wave output voltage pulses clipped or normalized to equal and constant crest heights and of pulse-time equality with such asymmetrical gate current are produced. In other words, the time-widths of the outputs pulses A and B correspond exactly with the time-widths of the currents P and N.

To read the time difference, $T_2 - T_1$, between the output pulses A and B, a voltmeter 51 may be connected to terminals 1–3. The meter is responsive to the voltage difference across the output resistors 46 and 49 and this difference is proportional to the quotient of the transductor D.C. inputs. Thus, the meter indicates the ratio of the transductor input currents.

By using a buck-boost input $i_2$ of the transductor which is allowed to vary and holding the transductor-connected input $i_1$ constant, then the output voltage across the output resistors 46–49 or terminals 1–3 is proportional to $i_2$ and the operation is similar to an amplifier. Under the same D.C. input conditions, if the output voltage is taken across terminals 1–2, so as to be taken across output resistor 46 only, the time-width thereof is determined by and increases with increase in $i_2$; if taken across terminals 2–3, hence across output resistor 49, the time-width is determined by $i_2$, but decreases with increase in $i_2$. In other words, as $i_2$ is made larger, the time-width of the output voltage across resistor 46 increases, whereas across resistor 49 it gets smaller. The converse of this occurs as $i_2$ is made smaller. Thus, by selectively taking an output between terminals 1–2 or 2–3, there is provided undirectional pulses of controlled variable time-width or duration that either increase or decrease in time-width in accordance with the buck-boost input current $i_2$ to the transductor. Thereby, the device is essentially a variable pulse time generator adapted for actuating means which is responsive to such voltage pulses.

In some cases, where a somewhat reduced accuracy may be tolerated, the Zener diodes may be omitted for simplification and cost saving. However, they preferably will be used because of their advantage in giving a sharper rate of rise of the output pulses and top clipping thereof to a smoother form than can be obtained by the transistors and their load resistors alone.

In the foregoing detailed description, the dual D.C. input winding means on the transductor cores 11 and 12 which preferably will be used for effecting the differential D.C. excitation of the cores with respect to each other has been described. However, it is within the scope of my invention for some applications that the boost winding 18 on transductor core 12 can be omitted and relying on the buck relation of the windings 15 and 17 on transductor core 11 to produce the differential D.C. excitation of the cores 11 and 12 relative to each other. In operation, as before, there is produced a proportional alternating current output which flows through the load resistor 23 with asymmetrical positive and negative-going waves as to crest heights and time-widths and related to each other in accordance with the net D.C. excitations on the transductor cores.

Some of the advantages and benefits realized from my invention as thus hereinabove described in detail include the following:

*Voltage isolation.*—All D.C. currents are completely isolated from each other against voltage breakdown.

*High stability.*—Since the two cores are practically identical, the operating temperature thereof is the same and effect of temperature changes thereon will not influence operation or output (input currents with series connected input windings are the same, giving $I^2R$ heat in core windings so temperature rise from winding heat is the same in both cores).

*Low power requirement.*—D.C. current inputs required may be extremely small, generally milliamps and since the D.C. control windings are low ohms, the D.C. input wattage is very small. Any power frequency within design or capability of the cores is usable.

*Self regulation with A.C. volts.*—Since the fundamental circuit for the core windings is a series transductor, the inherent voltage regulation or effect on output (gate current) with nominal A.C. voltage variations is small, roughly ⅛.

*Output power.*—Fairly large voltage is available from the simple amplifier without reamplification.

*Cool operation.*—Amplifier is not hard driven since it operates in a saturated mode and acts more like a switch. Therefore, there is very little heat loss in the transistors.

*Low cost.*—Cores are small size, need not be perfectly matched. Windings have moderate number of turns, so cost of wound cores is low.

*Size.*—All parts are of small size so total assembly is compact and space-saving.

While particular embodiments of the invention have been illustrated and described, various changes in the form and details of structure and circuits employed will be apparent to those skilled in the art and may be made without departing from the scope of the invention as defined in the appended claims.

What is claimed is:

1. A magnetic A.C. pulse-time control system comprising:
    (a) a series transductor having two saturable magnetic cores, each provided with an alternating current gate winding, said gate windings being series connected;
    (b) an A.C. gate circuit connected across said gate windings;
    (c) series connected first and series connected second control windings on each of said cores;
    (d) first and second control circuits for receiving first and second control direct currents;
    (e) said first control circuit connected across said first control windings to apply the first control current thereto and said second circuit connected across said second control windings to apply the second control current thereto;
    (f) said control windings on one of said cores being in subtractive current relationship, and said control windings on the other of said cores being in additive current relationship, whereby said cores are differentially magnetized in accordance with the difference and the sum, respectively, of said control currents thereby causing the alternating square wave form of output current in said gate circuit to be asymmetrical in crest heights and time-widths and related to each other in accordance with the difference and the sum, respectively, of said control currents;
    (g) electrical means connected to said gate circuit and responsive to said asymmetrical square wave current for producing square wave output pulses with uniform and constant heights and of pulse-time equality with said asymmetrical square wave current.

2. A magnetic A.C. pulse-time control system comprising:
    (a) a series transductor having two saturable magnetic cores, each provided with an alternating current gate winding, said gate windings being series connected;
    (b) an A.C. gate circuit connected across said gate windings;
    (c) series connected first and series connected second control windings on each of said cores;
    (d) first and second control circuits for receiving first and second control direct currents respectively representative of predetermined quantities;
    (e) said first control circuit connected to said first control windings in a series circuit arrangement to apply the first control current thereto and said second circuit connected to said second control windings in a series circuit relation to apply the second control current thereto;
    (f) said control windings on one of said cores being in subtractive current relationship, and said control windings on the other of said cores being in additive current relationship, whereby said cores are differentially magnetized in accordance with the difference and the sum, respectively, of said control currents thereby causing the alternating square wave form of output current in said gate circuit to be asymmetrical in crest heights and time-widths and related to each other in accordance with the difference and sum, respectively, of said control currents;

(g) electrical means including a pulse clipping means connected to said gate circuit and responsive to said asymmetrical square wave current for producing square wave output pulses with uniform and constant heights and of pulse-time equality with said asymmetrical square wave current; and (h) a utilization circuit responsive to said square wave output pulses for utilizing the time difference therebetween in a predetermined mathematical relationship of said predetermined quantities.

3. A magnetic A.C. pulse-time control system comprising:

(a) a transductor having two saturable toroid cores of square-loop magnetic material, each having a series connected first input winding, a series connected second input winding, and a series connected gate winding thereon;

(b) a transformer having a low voltage secondary winding and a primary winding connectable to an A.C. supply source;

(c) a series gate circuit connected to said secondary winding and including in series circuit relation said gate windings and a center-tapped load resistor for energization form said A.C. supply source;

(d) first and second control circuits for receiving separate control direct currents;

(e) said first control circuit connected to said first input windings in series circuit relation to apply said first control current thereto and said second control circuit connected to said second input windings in series circuit relation to apply said second control circuit thereto;

(f) said first input windings being phased relative to said gate windings to provide series transductor operation of said cores and produce alternating output current of generally square wave form;

(g) said input windings being connected in subtractive current relationship with respect to each other on one core and in additive current relationship with respect to each other on the other core, whereby said cores are differentially excited in accordance with the difference and the sum, respectively, of said control currents thereby causing the crest heights of said alternating square wave output current to be proportional to and their time-widths to be inversely proportional to the sum and difference, respectively, of said control currents; and (h) amplifier means connected to and responsive to the flow of said output current through said load resistor for producing square wave pulses of uniform and constant crest heights and of time-widths corresponding to the time-widths of the aforesaid output current.

4. The invention as defined in claim 3, wherein said transformer includes a center-tapped secondary winding across one end and the center tap of which said gate circuit is connected:

(a) a compensator comprising a toroid core of material similar to that of said transductor cores and a winding thereon connected at one end to the other end of said secondary winding and at its other end through a series resistor to said gate circuit at the common junction point between said load resistor and said gate windings;

(b) the exciting current for said compensating core flowing through said load resistor in opposition and neutralizing the exciting current flow for said transductor cores through said load resistor, whereby the tops of the square wave current flowing through said load resistor are rendered substantially level.

5. The invention as defined in claim 4, wherein a short-circuited winding of a few turns is provided on said compensating core to increase the effectiveness of said compensator.

6. The invention as defined in claim 3, wherein said amplifier is of the saturated transistor type and includes a first and a second transistor having base input circuits connected to opposite ends of said load resistor, respectively, and alternately are driven on and off responsively to the flow of said output current through said load resistor:

(a) a direct current power supply for said transistors including an adjustable balancing resistor having its adjusting arm connected to the center tap of said load resistor to provide a common bias return for the base input circuits of said transistors;

(b) each transistor having an emitter circuit connected to one side of said D.C. power supply and a collector output circuit including two load resistors in series, the outermost of such resistors having their outer ends connected to each other and to a common output terminal and to the other side of said D.C. power supply;

(c) said transistors providing substantially square wave output voltage pulses across their said outermost load resistors of equal and constant crest heights and of pulse-times identical with the times of the positive and negative-going current wave through said center-tapped load resistor;

(d) output terminals connected, respectively, to the junction point between said series connected load resistors permitting outputs to be taken from the amplifier across both said output terminals and across either of them and said common terminal, selectively.

7. The invention as defined in claim 6, wherein a Zener diode is shunted across each of said outermost load resistors of said collector circuits to provide a sharp rate of rise and constant crest heights to the voltage pulses across said load resistors.

8. In a variable pulse-time generator, in combination:

(a) a dual D.C. input series transductor comprised of two saturable magnetic cores having thereon series connected gate windings for energization from an A.C. source to provide alternating current output of generally square wave form;

(b) a first input winding means comprising two series connected input windings, one on each of said cores, and coacting with said gate windings to produce said square wave output current;

(c) a second input winding means on at least one of said cores, and being in subtractive current relationship with said first input windings on said one core;

(d) means for applying separate direct currents to the respective input winding means to provide differential D.C. excitation of said cores equal to the sum and the difference of said direct currents flowing through the winding means on the respective cores whereby said output current has asymmetrical positive and negative-going waves as to crest heights and time-widths and related to each other in accordance with the net D.C. excitations on said cores;

(e) a load resistor in series with said gate windings through which said output current flows; and (f) amplifier means connected to and responsive to flow of said output current through said load resistor for producing square wave output pulses of uniform and constant crest heights and of time-widths corresponding to the time-widths of the positive and negative-going waves of said output current.

9. The variable pulse-time generator as defined in claim 8, wherein said amplifier is of the saturated transistor type including alternately actuated switching transistors connected across said load resistor, and said transistors each having a collector output circuit which includes a load resistor and a Zener diode shunted across such resistor, for producing square wave output voltage pulses of equal and constant crest heights and of time-widths corresponding to the time-widths of the positive and negative-going portions of the alternating current flowing through said load resistor.

10. In a variable pulse-time generator, in combination:
(a) a dual D.C. input series transductor comprised of two saturable magnetic cores having thereon series connected gate windings for energization from an A.C. source to provide alternating current output of generally square wave form;
(b) a first input winding means comprising two series connected input windings, one on each of said cores, and coacting with said gate windings to produce said square wave output current;
(c) a second input winding means comprising only one input winding on one of said cores, and being in subtractive current relationship with said first input winding on said one core;
(d) means for applying separate direct currents to the respective input winding means to provide net D.C. excitations on said cores equal to the difference between said direct currents flowing through said input windings on said one core and equal to the direct current flowing through said input winding on the other core, whereby said output current has asymmetrical positive and negative-going waves as to crest heights and time-widths and related to each other in accordance with the net D.C. excitations on said cores;
(e) a load resistor in series with said gate windings through which said output current flows; and
(f) amplifier means connected to and responsive to flow of said output current through said load resistor for producing square wave output pulses of uniform and constant crest heights and of time-widths corresponding to the time-widths of the positive and negative-going waves of said output current.

11. In a variable pulse-time control system, in combination:
(a) a dual D.C. input series transductor comprised of two saturable magnetic cores having thereon series connected gate windings for energization from an A.C. source to provide alternating current output of generally square wave form;
(b) a first input winding means comprising two series connected input windings, one on each of said cores, and coacting with said gate windings to produce said square wave output current;
(c) a second input winding means comprising two series connected input windings, one on each of said cores, and arranged in subtractive current relationship with said first input windings on one of said cores, and in additive current relationship with said first input windings on the other of said cores;
(d) means for applying separate direct currents to the respective input winding means to provide net D.C. excitations on said cores equal to the sum and the difference of said direct currents flowing through the winding means on the respective cores whereby said output current has asymmetrical positive and negative-going waves as to crest heights and time-widths and related to each other in accordance with the net D.C. excitations on said cores;
(e) a load resistor in series with said gate windings through which said output current flows; and
(f) amplifier means including a semi-conductor device connected to and cyclically rendered conductive responsively to the flow of one of the positive and negative-going waves of said output current through said resistor to provide square wave output voltage pulses of constant crest heights and of time-widths and frequency equality with that of said one wave of the alternating current flowing in said resistor.

References Cited

UNITED STATES PATENTS

| 2,808,988 | 10/1957 | Kafka | 235—195 |
| 2,917,238 | 12/1959 | Blizard | 235—194 |
| 3,042,306 | 7/1962 | Geyger | 235—178 |
| 3,239,656 | 3/1966 | Seegmiller | 235—178 |

MALCOLM A. MORRISON, *Primary Examiner.*

J. F. RUGGIERO, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,260            September 3, 1968

Max J. Kramer

It is certified that error appears in the above identified patent and that said Letters Patent are hereby corrected as shown below:

Column 3, line 57, after "$I_1$" and "$I_2$" insert -- * --.

Column 4, line 63, "pulsees" should read -- pulses --. Column 5, line 23, "undirectional" should read -- unidirectional --. Column 7, line 24, "form" should read -- from --.

Signed and sealed this 11th day of November 1969.

(SEAL)
Attest:

Edward M. Fletcher, Jr.          WILLIAM E. SCHUYLER, JR.
Attesting Officer                   Commissioner of Patents